United States Patent
Luzzato et al.

(10) Patent No.: US 9,900,698 B2
(45) Date of Patent: Feb. 20, 2018

(54) GRAPHENE COMPOSITE ACOUSTIC DIAPHRAGM

(71) Applicant: Apple Inc., Cupertino, CA (US)

(72) Inventors: Victor Luzzato, Taipei (TW); Joseph C. Poole, Cupertino, CA (US); Christopher D. Prest, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 14/788,205

(22) Filed: Jun. 30, 2015

(65) Prior Publication Data

US 2017/0006382 A1    Jan. 5, 2017

(51) Int. Cl.
| H04R 1/00 | (2006.01) |
| H04R 11/02 | (2006.01) |
| H04R 9/06 | (2006.01) |
| H04R 7/20 | (2006.01) |
| B29C 45/00 | (2006.01) |
| H04R 7/12 | (2006.01) |
| B29K 507/04 | (2006.01) |
| B29L 31/38 | (2006.01) |

(52) U.S. Cl.
CPC ........... H04R 7/20 (2013.01); B29C 45/0001 (2013.01); B29C 45/0013 (2013.01); H04R 7/12 (2013.01); *B29K 2507/04* (2013.01); *B29L 2031/38* (2013.01)

(58) Field of Classification Search
USPC ........................................ 381/423, 424, 398
See application file for complete search history.

(56) References Cited

U.S. PATENT DOCUMENTS

| 1,276,708 A | 8/1918 | Blair |
| 1,646,628 A | 10/1927 | Nolen |
| 1,893,291 A | 1/1933 | Kwartin |
| 1,992,605 A | 2/1935 | Clifford et al. |
| 2,325,688 A | 7/1943 | Landis |
| 2,779,095 A | 1/1957 | Hottenroth, Jr. |
| 3,414,689 A | 12/1968 | Gummel et al. |
| 3,866,299 A | 2/1975 | Gregg et al. |

(Continued)

FOREIGN PATENT DOCUMENTS

| CN | 204104134 | 1/2015 |
| EP | 2094032 | 8/2009 |

(Continued)

OTHER PUBLICATIONS

Baechtle et al., "Adjustable Audio Indicator," IBM, 2 pages, Jul. 1, 1984.

(Continued)

*Primary Examiner* — Quoc D Tran
(74) *Attorney, Agent, or Firm* — Kilpatrick Townsend and Stockton, LLP

(57) ABSTRACT

The disclosure relates to an audio device that includes a diaphragm having a graphene material, such as a graphene flake, that is incorporated into a base material. The audio device may form part of a speaker device, a microphone device, or a headphone device. The concentration of the graphene and/or a size of the graphene flakes may be varied throughout the diaphragm to define a stiff center portion and a flexible portion that surrounds the center portion.

19 Claims, 7 Drawing Sheets

(56) References Cited

U.S. PATENT DOCUMENTS

| | | | |
|---|---|---|---|
| 4,068,103 A | 1/1978 | King et al. | |
| 4,081,631 A | 3/1978 | Feder | |
| 4,089,576 A | 5/1978 | Barchet | |
| 4,132,437 A | 1/1979 | Green | |
| 4,245,642 A | 1/1981 | Skubitz et al. | |
| 4,466,441 A | 8/1984 | Skubitz et al. | |
| 4,532,383 A * | 7/1985 | Willy | G10K 13/00 181/157 |
| 4,658,425 A | 4/1987 | Julstrom | |
| 5,106,318 A | 4/1992 | Endo et al. | |
| 5,293,002 A | 3/1994 | Grenet et al. | |
| 5,335,011 A | 8/1994 | Addeo et al. | |
| 5,406,038 A | 4/1995 | Reiff et al. | |
| 5,521,886 A | 5/1996 | Hirosawa et al. | |
| 5,570,324 A | 10/1996 | Geil | |
| 5,604,329 A | 2/1997 | Kressner et al. | |
| 5,619,583 A | 4/1997 | Page et al. | |
| 5,733,153 A | 3/1998 | Takahashi et al. | |
| 5,879,598 A | 3/1999 | McGrane | |
| 5,958,203 A | 9/1999 | Parce et al. | |
| 6,036,554 A | 3/2000 | Koeda et al. | |
| 6,073,033 A | 6/2000 | Campo | |
| 6,129,582 A | 10/2000 | Wilhite et al. | |
| 6,151,401 A | 11/2000 | Annaratone | |
| 6,154,551 A | 11/2000 | Frenkel | |
| 6,192,253 B1 | 2/2001 | Charlier et al. | |
| 6,317,237 B1 | 11/2001 | Nakao et al. | |
| 6,370,005 B1 | 4/2002 | Sun et al. | |
| 6,400,825 B1 | 6/2002 | Miyamoto et al. | |
| 6,516,077 B1 | 2/2003 | Yamaguchi et al. | |
| 6,553,126 B2 | 4/2003 | Han et al. | |
| 6,700,987 B2 | 3/2004 | Kuze et al. | |
| 6,775,383 B1 * | 8/2004 | Lane | F16F 15/03 381/71.1 |
| 6,813,218 B1 | 11/2004 | Antonelli et al. | |
| 6,829,018 B2 | 12/2004 | Lin et al. | |
| 6,882,335 B2 | 4/2005 | Saarinen | |
| 6,892,850 B2 | 5/2005 | Suzuki et al. | |
| 6,924,792 B1 | 8/2005 | Jessop | |
| 6,934,394 B1 | 8/2005 | Anderson | |
| 6,942,771 B1 | 9/2005 | Kayyem | |
| 7,003,099 B1 | 2/2006 | Zhang et al. | |
| 7,059,932 B1 | 6/2006 | Tobias et al. | |
| 7,082,322 B2 | 7/2006 | Harano | |
| 7,116,795 B2 | 10/2006 | Tuason et al. | |
| 7,154,526 B2 | 12/2006 | Foote et al. | |
| 7,158,647 B2 | 1/2007 | Azima et al. | |
| 7,181,030 B2 | 2/2007 | Rasmussen et al. | |
| 7,263,373 B2 | 8/2007 | Mattisson | |
| 7,266,189 B1 | 9/2007 | Day | |
| 7,362,877 B2 | 4/2008 | Honda et al. | |
| 7,378,963 B1 | 5/2008 | Begault et al. | |
| 7,416,047 B2 * | 8/2008 | Frasl | H04R 7/14 181/173 |
| 7,527,523 B2 | 5/2009 | Yohn et al. | |
| 7,536,029 B2 | 5/2009 | Choi et al. | |
| 7,570,772 B2 | 8/2009 | Sorensen et al. | |
| 7,679,923 B2 | 3/2010 | Inagaki et al. | |
| 7,792,320 B2 | 9/2010 | Proni | |
| 7,867,001 B2 | 1/2011 | Ambo et al. | |
| 7,878,869 B2 | 2/2011 | Murano et al. | |
| 7,903,061 B2 | 3/2011 | Zhang et al. | |
| 7,912,242 B2 | 3/2011 | Hikichi | |
| 7,966,785 B2 | 6/2011 | Zadesky et al. | |
| 8,031,853 B2 | 10/2011 | Bathurst et al. | |
| 8,055,003 B2 | 11/2011 | Mittleman et al. | |
| 8,116,505 B2 | 2/2012 | Kawasaki-Hedges et al. | |
| 8,116,506 B2 | 2/2012 | Kuroda et al. | |
| 8,161,890 B2 | 4/2012 | Wang | |
| 8,204,266 B2 | 6/2012 | Munoz et al. | |
| 8,218,397 B2 | 7/2012 | Chan | |
| 8,226,446 B2 | 7/2012 | Kondo et al. | |
| 8,264,777 B2 | 9/2012 | Skipor et al. | |
| 8,286,319 B2 | 10/2012 | Stolle et al. | |
| 8,340,312 B2 | 12/2012 | Johnson et al. | |
| 8,409,417 B2 | 4/2013 | Wu | |
| 8,417,298 B2 | 4/2013 | Mittleman et al. | |
| 8,447,054 B2 | 5/2013 | Bharatan et al. | |
| 8,452,037 B2 | 5/2013 | Filson et al. | |
| 8,488,817 B2 | 7/2013 | Mittleman et al. | |
| 8,508,908 B2 | 8/2013 | Jewell-Larsen | |
| 8,509,462 B2 * | 8/2013 | Jeong | H04R 17/00 381/173 |
| 8,560,309 B2 | 10/2013 | Pance et al. | |
| 8,574,004 B1 | 11/2013 | Tarchinski et al. | |
| 8,620,162 B2 | 12/2013 | Mittleman | |
| 8,632,670 B2 | 1/2014 | Garimella et al. | |
| 8,644,519 B2 | 2/2014 | Pance et al. | |
| 8,644,533 B2 | 2/2014 | Burns | |
| 8,693,698 B2 | 4/2014 | Carnes et al. | |
| 8,724,841 B2 | 5/2014 | Bright et al. | |
| 8,804,993 B2 | 8/2014 | Shukla et al. | |
| 8,811,648 B2 | 8/2014 | Pance et al. | |
| 8,858,271 B2 | 10/2014 | Yeung et al. | |
| 8,882,547 B2 | 11/2014 | Asakuma et al. | |
| 8,983,097 B2 | 3/2015 | Dehe et al. | |
| 8,989,428 B2 | 3/2015 | Kwong | |
| 9,007,871 B2 | 4/2015 | Armstrong-Muntner | |
| 9,066,172 B2 | 6/2015 | Dix et al. | |
| 9,161,434 B2 | 10/2015 | Merz et al. | |
| 9,227,189 B2 | 1/2016 | Sobek et al. | |
| 9,229,494 B2 | 1/2016 | Rayner | |
| 2003/0087292 A1 | 5/2003 | Chen et al. | |
| 2004/0203520 A1 | 10/2004 | Schirtzinger et al. | |
| 2005/0009004 A1 | 1/2005 | Xu et al. | |
| 2005/0271216 A1 | 12/2005 | Lashkari | |
| 2006/0008111 A1 * | 1/2006 | Nagaoka | H04R 7/122 381/423 |
| 2006/0062421 A1 * | 3/2006 | Kuribayashi | H04R 7/14 381/424 |
| 2006/0072248 A1 | 4/2006 | Watanabe et al. | |
| 2007/0012827 A1 | 1/2007 | Fu et al. | |
| 2008/0053745 A1 * | 3/2008 | Tada | H04R 1/24 181/165 |
| 2008/0204379 A1 | 8/2008 | Perez-Noguera | |
| 2008/0260188 A1 | 10/2008 | Kim | |
| 2008/0292112 A1 | 11/2008 | Valenzuela et al. | |
| 2008/0310663 A1 | 12/2008 | Shirasaka et al. | |
| 2009/0045005 A1 | 2/2009 | Byon et al. | |
| 2011/0002487 A1 | 1/2011 | Panther et al. | |
| 2013/0129122 A1 | 5/2013 | Johnson et al. | |
| 2013/0164999 A1 | 6/2013 | Ge et al. | |
| 2013/0259281 A1 | 10/2013 | Filson et al. | |
| 2013/0280965 A1 | 10/2013 | Kojyo | |
| 2014/0093113 A1 | 4/2014 | Dix et al. | |
| 2014/0105440 A1 | 4/2014 | Mittleman et al. | |
| 2014/0140558 A1 | 5/2014 | Kwong | |
| 2014/0226826 A1 | 8/2014 | Utterman et al. | |
| 2014/0250657 A1 | 9/2014 | Stanley et al. | |
| 2015/0078611 A1 | 3/2015 | Boozer et al. | |
| 2015/0208178 A1 * | 7/2015 | Pinkerton | H04R 1/283 381/396 |
| 2015/0326959 A1 | 11/2015 | Zadesky et al. | |
| 2016/0157022 A1 * | 6/2016 | Zhou | H04R 19/02 381/191 |
| 2016/0212546 A1 * | 7/2016 | Salvatti | H04R 9/06 |

FOREIGN PATENT DOCUMENTS

| | | |
|---|---|---|
| GB | 2310559 | 8/1997 |
| GB | 2342802 | 4/2000 |
| JP | 2102905 | 4/1990 |
| JP | 2003319490 | 11/2003 |
| JP | 2004153018 | 5/2004 |
| JP | 2006297828 | 11/2006 |
| WO | WO03/049494 | 6/2003 |
| WO | WO04/025938 | 3/2004 |
| WO | WO2007/083894 | 7/2007 |
| WO | WO08/153639 | 12/2008 |
| WO | WO2009/017280 | 2/2009 |

(56) References Cited

FOREIGN PATENT DOCUMENTS

| WO | WO2011/057346 | 5/2011 |
|---|---|---|
| WO | WO2011/061483 | 5/2011 |

OTHER PUBLICATIONS

Blankenbach et al., "Bistable Electrowetting Displays," https://spie.org/x43687.xml, 3 pages, Jan. 3, 2011.
Pingali et al., "Audio-Visual Tracking for Natural Interactivity," Bell Laboratories, Lucent Technologies, pp. 373-382, Oct. 1999.
Zhou et al., "Electrostatic Graphene Loudspeaker," Applied Physics Letters, vol. 102, No. 223109, 5 pages, Dec. 6, 2012.

* cited by examiner

GRAPHENE COMPOSITE ACOUSTIC DIAPHRAGM

FIELD

Embodiments described herein generally relate to the field of acoustic systems and, more specifically, to an acoustic device that includes a diaphragm having one or more portions formed using graphene.

BACKGROUND

Audio functionality is an important aspect of various electronic devices. For example, laptop computers, tablets, mobile telephones, and the like may all include some type of acoustic speaker and/or microphone to transmit and/or receive audio signals. As devices become smaller and lighter, it becomes more difficult to provide high-quality audio devices using conventional materials. In particular, it may be challenging to produce an audio device that is compact and lightweight while also providing a desired audio performance.

SUMMARY

Embodiments described herein may relate to, include, or take the form of acoustic devices having a diaphragm that incorporates a graphene material, such as graphene flakes. In some embodiments, a polymer composite may include graphene flakes and form at least a portion of a diaphragm. The polymer composite may be used to make the diaphragm thinner, stiffer, and/or lighter.

Some example embodiments are directed to an audio device including a support structure and an acoustic element that is disposed within a recess of the support structure. The audio device also includes a diaphragm that is coupled to the support structure. The diaphragm may include a center portion formed from a base material and a graphene flake material that is incorporated into the base material. The diaphragm also includes a flexible portion that surrounds the center portion. The flexible portion may be coupled to the support structure and may be configured to flex in response to a movement of the center portion with respect to the support structure or acoustic element. In some embodiments, the base material comprises a polymer and the graphene flake material is molded into the polymer material.

In some embodiments, the center portion has a first stiffness that is greater than a second stiffness of the flexible portion. The center portion may include a first concentration of graphene flakes and the flexible portion may include a second concentration of graphene flakes. The first concentration may be greater than the second concentration. In some embodiments, the center portion includes a first size of graphene flake and the flexible portion includes a second size of graphene flake. The first size may be greater than the second size resulting in a stiffer center portion.

In some embodiments, the center portion includes a membrane structure and a composite cap structure that is bonded to a surface of the membrane structure. A portion of the membrane structure may form the flexible portion of the diaphragm. The diaphragm may form a conical dome shape or other similar contoured shape.

In some embodiments, the audio element includes a magnet that is disposed within the recess of the support structure. A voice coil may be attached to the center portion of the diaphragm and may be electromagnetically coupled to the magnet. The flexible portion may be configured to flex in response to relative motion between the magnet and the voice coil. The audio device may form a speaker, a headphone, a microphone, or other similar device.

Some example embodiments are directed to a portable electronic device that includes a housing that defines an opening. A display may be positioned in the opening of the housing. A processor may be coupled to the display and an audio device. The audio device may include a support structure and a diaphragm that is flexibly connected to the support structure. The diaphragm may be formed from graphene that is incorporated into a base material. The concentration of the graphene may vary within the diaphragm to define a center portion and a flexible portion such that the center portion is stiffer than the flexible portion. The diaphragm may be configured to transmit and/or receive sound waves.

In some embodiments, the center portion includes an inner center portion and an outer center portion that surrounds the inner center portion. The outer center portion may have a graphene concentration that is lower than a graphene concentration of the inner center portion. The flexible portion may include a graphene concentration that is lower than the graphene concentration of the outer center portion.

The diaphragm may form a conically shaped dome structure. The conically shaped dome structure may define an edge portion surrounding the flexible portion in a location where the edge portion is attached to the support structure. In some embodiments, a graphene concentration of the edge portion is greater than the graphene concentration of the flexible portion.

Some example embodiments are directed to a method for manufacturing a diaphragm for an audio device. The method may include preparing a base material and adding graphene flakes to the base material to create a composite mixture. The method may also include forming a diaphragm by molding the composite mixture. In some cases, the diaphragm is installed in an acoustic device. In some embodiments, adding the graphene flakes includes varying the concentration of the graphene flakes to form two or more distinct portions of the diaphragm. In some cases, the base material comprises a polymer and the molding process includes an injection molding process.

The diaphragm may include a dome structure. A first concentration of graphene flakes may be increased in a center portion of the dome structure as compared to a second concentration of graphene flakes in a flexible portion surrounding the center portion.

In some embodiments, the composite mixture is a first composite mixture having a first concentration and/or first size of graphene flakes. Graphene flakes may be added to the base material to create a second composite mixture having a second concentration and/or size of graphene flakes. The first concentration may be greater than the second concentration and/or the first size graphene flake may be greater than the second size of graphene flake. A center portion of the diaphragm may be molded using the first composite mixture. A flexible portion of the diaphragm surrounding the center portion may be molded using the second composite mixture.

Forming the diaphragm may further comprise forming an inner center portion having a first concentration of graphene flakes and forming an outer center portion having a second concentration of graphene flakes that is lower than the first concentration. A flexible portion may also be formed having a third concentration of graphene flakes that is lower than the second concentration.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
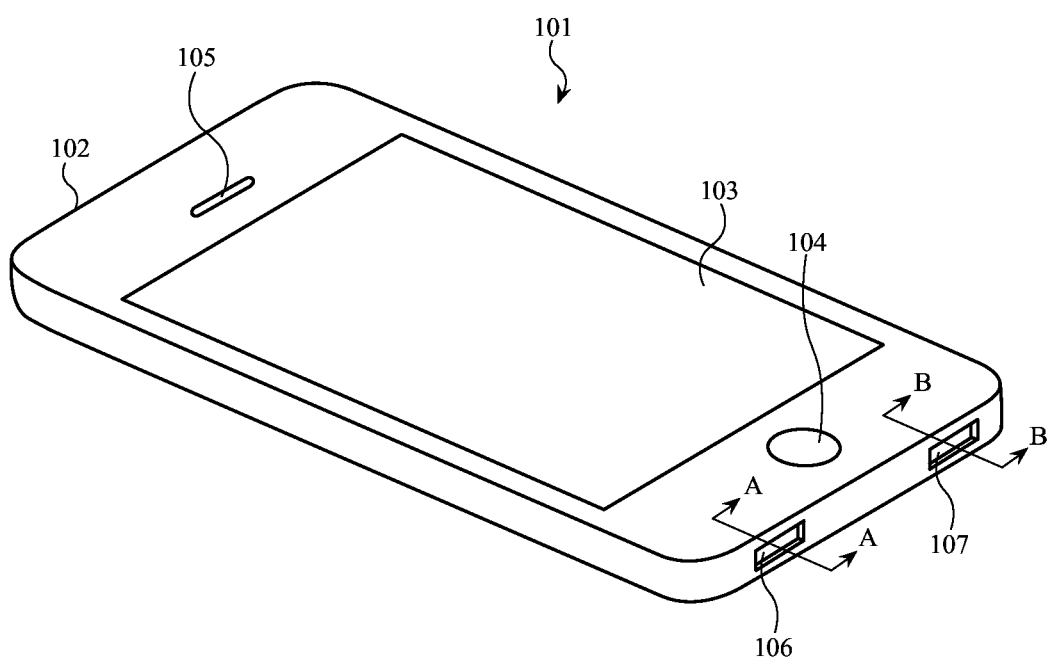
FIG. 1 depicts an example electronic device including an audio device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a diaphragm formed from a composite graphene material. In general, the physical characteristics of a diaphragm may affect the performance of an audio device, such as a speaker or microphone. In particular, the acoustic performance of a speaker may depend, at least in part, on the geometry and/or structural properties of the diaphragm. In general, a speaker may include an audio element, such as a transducer (e.g., voice coil), that converts an electrical signal into movement of a diaphragm. Movement of the diaphragm may produce a pressure differential that forms sound waves or other acoustic response. The performance of the speaker may be quantified by the degree of correlation between the electrical signal provided to the speaker and the mechanical response of the transducer and diaphragm.

The correlation between an electrical input and the mechanical output of a speaker may not be perfect due to practical limitations of the hardware. Variability in the correlation between the electrical signal and the mechanical or acoustic response may sometimes be referred to as distortion. In general, a diaphragm having a high stiffness and light weight may allow a speaker transducer to react more quickly, which may minimize or reduce distortion of the electrical signal. Therefore, it may be advantageous to use a material that has a high strength to weight ratio.

Achieving low distortion in small audio devices is particularly challenging. Using some traditional materials, the mass of the diaphragm may be too high for a small or compact transducer, which may result in unacceptable levels of distortion. In some cases, the distortion may be reduced by using a mechanical damper. However, mechanical dampers may increase the complexity and cost as well as reduce the power efficiency of the audio device.

The embodiments described herein are directed to acoustic devices having a diaphragm incorporating a graphene or graphene flake material, which may increase the stiffness of the diaphragm without significantly increasing the weight. The graphene may be included in a graphene-flake composite polymer material that is molded or otherwise formed into the diaphragm component. The composite polymer may be used to make the diaphragm thinner, stiffer, and/or lighter, as compared to some traditional diaphragm materials. In some embodiments, a graphene composite polymer may be used to create smaller acoustic devices without significantly compromising audio quality.

In some implementations, using a graphene flake material may improve the mechanical response of the audio device. In particular, a diaphragm formed from a graphene or graphene flake material may be configured to have a mass and spring constant that is tuned to provide a particular mechanical or acoustic response. In some cases, the use of graphene or graphene flake material may reduce or eliminate the need for additional external damping. Graphene may be used to produce a light diaphragm with a low spring constant (e.g., stiffer), which may eliminate the need for a separate damping mechanism, which may reduce complexity of the audio device. A reduction in dampening may also improve the efficiency and reduce the power consumption of the audio device.

In some embodiments described herein, the concentration of the graphene may be varied throughout the diaphragm to provide a structure having particular mechanical properties. In particular, a higher concentration of graphene may be used in a center portion of the diaphragm to increase stiffness and possibly reduce the weight of the moving mass. A lower concentration of graphene may be used in a flexible portion or other portion to increase the flexibility of select regions of the diaphragm.

In some embodiments described herein, the graphene includes a graphene flake that may be configured to provide particular mechanical properties. In some cases, the size of the graphene flake may be varied throughout the diaphragm to provide a structure having the desired stiffness or flexibility. In some implementations, the center portion may include a first size of graphene flake that is larger than a second size of graphene flake in the flexible portion. An increased size of the graphene flake may result in a stiffer center portion as compared to the flexible portion. The graphene flakes may also be oriented or aligned along one or more directions to provide particular mechanical properties. In particular, the a flake area of the graphene flakes may be substantially aligned with an outer or inner surface of the diaphragm.

While the examples described herein are directed to a graphene material in the form of a graphene flake, the examples may also apply to other forms of graphene. In particular, instead of graphene flake, the embodiments described herein may use a graphene flake stack, graphene fiber, graphene sheet, graphene spheres, graphene clusters, graphene chips, graphene particles, and so on. A combination of graphene materials may also be used to form the composite graphene diaphragm.

Some embodiments are directed to a method for manufacturing a diaphragm for an audio device, such as a speaker or microphone device. The method may include forming two or more distinct portions of the diaphragm using different concentrations of and/or different size graphene flakes. In some embodiments, variable amounts of graphene are incorporated into a base diaphragm material to provide a diaphragm having different levels of stiffness in different regions. In some cases, the stiffness of the diaphragm can be increased without significantly changing the mass of the diaphragm, which may reduce or eliminate the need for inclusion of additional mechanical damping mechanisms or elements in the audio device.

These and other embodiments are discussed below with reference to FIGS. 1-7. However, those skilled in the art will readily appreciate that the detailed description given herein with respect to these Figures is for explanatory purposes only and should not be construed as limiting.

In general, a diaphragm that includes graphene, such as a graphene flake, may be incorporated into a variety of acoustic devices including, for example, a speaker or a microphone of an electronic device. FIG. 1 depicts an example electronic device 101 that includes both a speaker device 106 and microphone device 107 (example audio devices). As described in more detail below, the speaker device 106 and/or the microphone device 107 may include a diaphragm that includes or incorporates a graphene or graphene flake material to increase the stiffness of the diaphragm and potentially improve the performance of the corresponding audio device(s).

In the example depicted in FIG. 1, the electronic device 101 is implemented as a smartphone. Other example electronic devices may include, without limitation, a desktop computing device, a notebook computing device, a tablet computing device, a wearable electronic device, a health monitoring device, a gaming device, a remote control device, and other types of electronic and portable electronic devices. While the following description is provided with respect to audio components integrated with an electronic device, the principles of an audio component having a graphene diaphragm may also be applied to accessory devices, such as a headphones, headsets, stand-alone speakers, and so on.

As shown in FIG. 1, the electronic device includes a housing 102 that encloses and protects the internal components of the device 101. Example internal components are described in more detail below with respect to FIG. 7. The housing 102 may define one or more openings for user input devices, such as the button 104 depicted in FIG. 1.

The housing 102 may also define an opening in a top surface and a display 103 may be disposed or positioned within the opening. The display 103 may be attached directly to the housing 102 or secured within the device 101 using another component. The display 103 may include a liquid crystal display (LCD), organic light emitting diode (OLED) display, electroluminescent (EL) display, or other type of display element. The display 103 may be configured to provide a visual output to the user including, for example, a graphical user interface. The display 103 may also be configured to provide visible media content including video, images, or other graphical content. In some cases, the display 103 may also incorporate a touch sensor for receiving user input.

As shown in FIG. 1, the device 101 includes a speaker device 106 for providing audio output to the user. The audio output may correspond to the visual output provided by the display 103 and/or provide audio feedback for user input devices, such as the button 104. In some embodiments, the speaker device 106 is configured to provide the audio for a telephone call or other audible communication. A more detailed description of the speaker device 106 is provided below with respect to FIG. 2.

As shown in FIG. 1, the device 101 also includes a microphone device 107. The microphone device 107 may be configured to receive audio signals or input from the user or from a source external to the device 101. In some cases, the microphone device 107 is configured to receive audio input for a telephone call or other audible communication. A more detailed description of the microphone device 107 is provided below with respect to FIG. 3.

Figure 2:
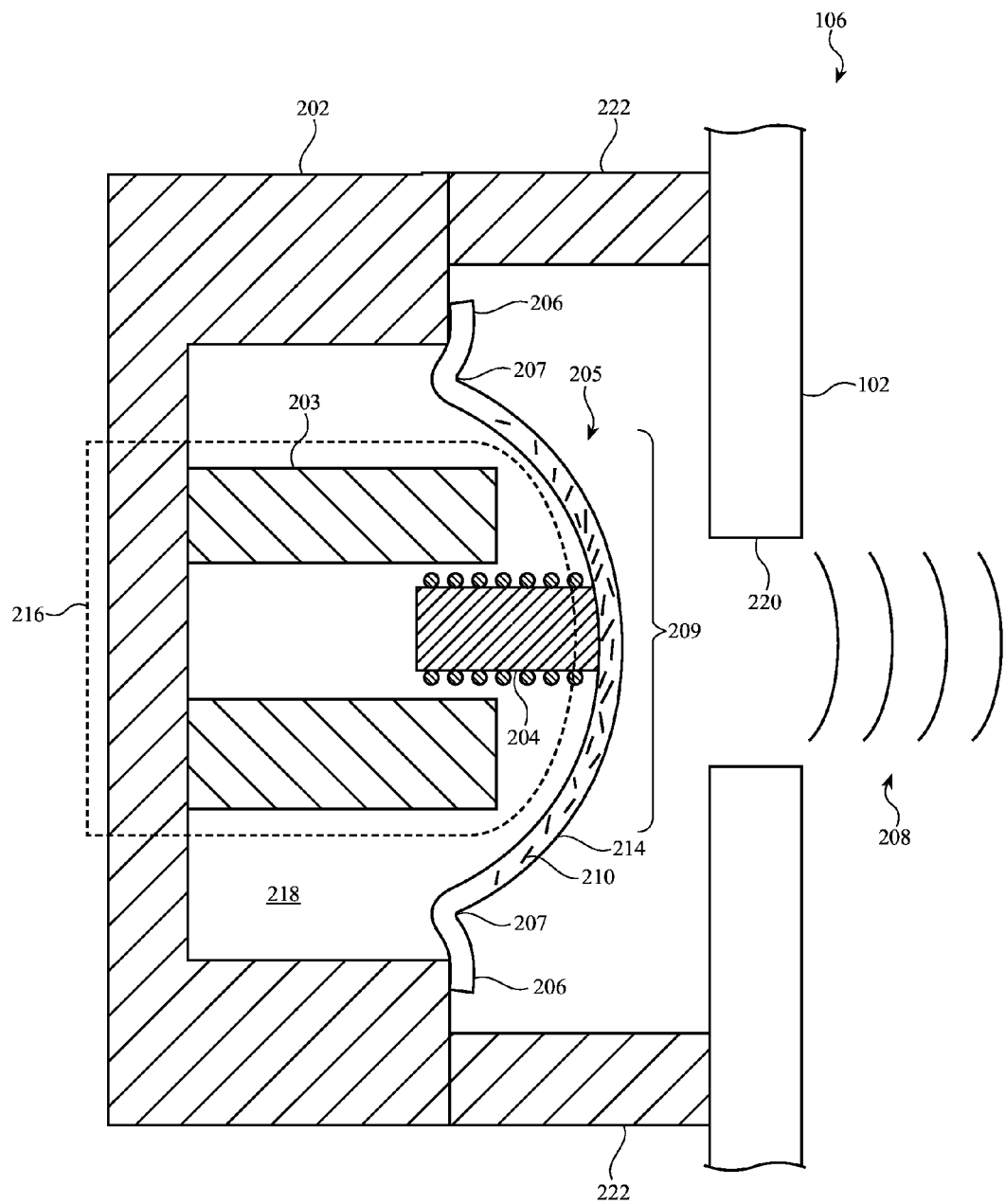
FIG. 2 is a cross-sectional view of a speaker device taken along section A-A.
Figure 3:
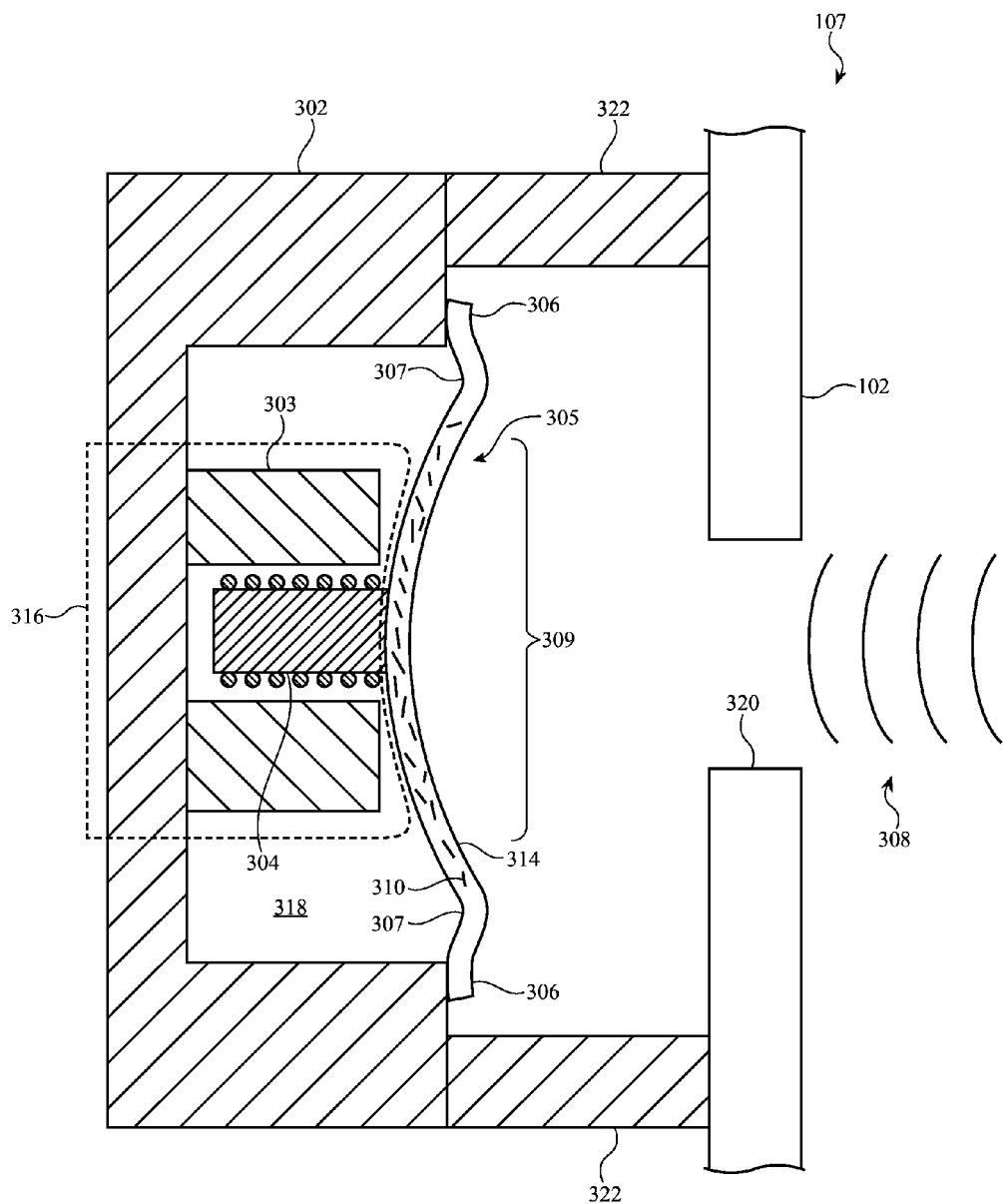
FIG. 3 is a cross-sectional view of a microphone device taken along section B-B.

As previously discussed, audio devices such as speakers and microphones may include a diaphragm component or element. In some cases, it may be advantageous for the diaphragm to include or incorporate a graphene material (e.g., a graphene flake). FIGS. 2 and 3 depict example audio devices that may use a graphene-based diaphragm.

FIG. 2 depicts a cross-sectional view the speaker device 106 taken along section A-A of FIG. 1. As described previously, the speaker device 106 may be incorporated with an electronic device (e.g., device 101 of FIG. 1) and used to produce an audio output. The speaker device 106 represents an example configuration of an audio device that includes a diaphragm formed using graphene (e.g., graphene flake). While the speaker device 106 depicted in FIG. 2 represents an illustrative example, the configuration is not intended to be limiting.

As shown in FIG. 2, the speaker device 106 includes a support structure 202, a magnet 203, a voice coil 204, and a diaphragm 205. The support structure 202 defines a recess 218, which may include a partially enclosed portion of the support structure 202 in which an audio element 216 is positioned. An example audio element 216, such as an electromagnetic transducer, may be formed between a magnet 203 and a voice coil 204, which may move with respect to each other in response to an electrical signal provided to the voice coil 204. Changes in the electromagnetic fields produced by the voice coil 204 (due to the electrical signal) may result in a motive force between the voice coil 204 and the magnet 203. The motive force may produce the relative movement between the voice coil 204 and the magnet 203. In some cases, the magnet 203 may be described as being electromagnetically coupled to the voice coil 204.

As shown in FIG. 2, a support structure 202, which may be fixed, is coupled to the magnet 203. Thus, a motive force between the voice coil 204 and the magnet 203 results in a movement of the voice coil 204. In the present embodiment, the diaphragm 205 is attached to the voice coil 204 such that movement of the voice coil 204 results in a movement of a center portion 209 of the diaphragm 205 with respect to the support structure 202. Movement of diaphragm 205 may cause the diaphragm 205 to displace air and generate sound waves 208 as a result of a vibratory or oscillatory movement of the voice coil 204. In some embodiments, the sound waves 208 may create the acoustic output or response of the speaker device 106. As shown in FIG. 2, the diaphragm may include a conical dome shape that may facilitate the formation of the sound waves 208.

In the embodiment of FIG. 2, the diaphragm 205 is coupled to the support structure 202. In particular, the diaphragm 205 is attached to the support structure 202 at edge portion 206. In some embodiments, the edge portion 206 is located within or adjacent to a flexible portion 207 of the diaphragm, which surrounds the center portion 209 of the diaphragm 205. In this configuration, the edge portion 206 of the diaphragm 205 is fixed with respect to the support structure 202. Because the center portion 209 moves in conjunction with the voice coil 204, the center portion 209 will move with respect to the edge portion 206, which is coupled to the fixed support structure 202. Thus, the flexible portion 207 may be configured to provide compliance between the moving center portion 209 and the stationary edge portion 206, and may flex in response to a movement of the voice coil 204 with respect to the magnet 203.

It may be advantageous that the diaphragm have both flexible and stiff regions. In particular, the flexible portion 207 may form a flexible or compliant portion of the diaphragm 205 to accommodate the movement caused by oscillation of the voice coil 204. Additionally, to provide a suitable acoustic response, it may be advantageous that the center portion 209 of the diaphragm 205 be relatively stiff or rigid, which may result in sound waves 208 having a consistent and/or suitable audio quality.

Providing a diaphragm 205 that is both stiff or substantially rigid in the center portion 209 while also flexible or compliant in the flexible portion 207 may present a significant design challenge, particularly if the mass of the diaphragm 205 is very low. One potential solution is to incorporate graphene, such as a graphene flake material 210, into the diaphragm 205 in order increase the stiffness of the center portion 209. In some embodiments, center portion 209 is constructed of a base material 214 and a graphene flake material 210 that is incorporated into the base material 214. In some implementations, the base material 214 may include a polymer or other synthetic material.

The diaphragm 205 may include varying amounts of graphene in different regions or portions to provide both a rigid center portion 209 and a flexible portion 207. In some implementations, the concentration of graphene flake material in the center portion 209 is greater than the concentration of graphene flake material in the flexible portion 207. The greater concentration of graphene flake material may result in the center portion 209 having a stiffness that is greater than the flexible portion 207. In some embodiments, the flexible portion 207 has no graphene flakes or a substantially zero graphene flake concentration. Example diaphragms having varying concentrations of graphene flakes are described below with respect to FIGS. 4 and 5.

The diaphragm 205 may also have variations in graphene flake size. For example, the center portion 209 may include a first size of graphene flake and the flexible portion 207 may include a second size of graphene flake that is smaller than the first size. The decreased size of the graphene flake may result in a more flexible or pliable flexible portion 207 as compared to the center portion 209. Conversely, the increased size of the graphene flake may result in a stiffer center portion 209 as compared to the flexible portion 207.

While varying concentration and/or size of graphene flakes may be used to vary the stiffness of the diaphragm 205, graphene flakes may also be added in improve the water resistance of the diaphragm 205. In general, graphene flakes may be substantially impermeable to water and may function as a moisture barrier. Thus, graphene flakes 210 in various concentrations may be incorporated into the diaphragm 205 to reduce the water or moisture permeability of the diaphragm 205 and possibly improve the water resistance of the speaker 106.

The example diaphragm 205 depicted in FIG. 2 has a conical dome shaped structure with an outward or convex curvature. It should be understood that either a convex or a concave curvature may be used to produce the sound waves 208 and, thus, the specific shape or curvature is not critical to this embodiment. Additionally, while the example speaker device 106 of FIG. 2 depicts the magnet 203 as stationary and the voice coil 204 as moving, alternative embodiments may be constructed in which the voice coil 204 is stationary and the magnet 203 moves.

As shown in FIG. 2, the speaker device 106 may be incorporated into an electronic device (e.g., device 101 of FIG. 1). In particular, the support structure 202 may be coupled to a mounting structure 222 which attaches the speaker device 106 to the housing 102 of an electrical device. The mounting structure 222 may include multiple components or layers to facilitate mechanical coupling and/or acoustic isolation of the speaker device 106 with respect to the housing 102. In some embodiments, the mounting structure 222 includes one or more compliant layers or gaskets to create an acoustic seal between the speaker device 106 and the housing 102. Also, as shown in FIG. 2, the housing 102 may define an opening 220 or aperture through which the sound waves 208 may pass. The opening 220 may include a screen or other protective element to prevent the ingress of contaminants and protect the speaker device 106.

In a similar fashion, a diaphragm that includes graphene may be used to form other types of acoustic devices, such as a microphone. In general, a microphone may function as an acoustic-to-electric transducer or sensor that converts sound in air into an electrical signal. In some microphone embodiments, sound is first converted to mechanical motion using a diaphragm. The diaphragm may be coupled to a transducer which converts the mechanical motion into an electrical signal.

FIG. 3 depicts a cross-sectional view of an example microphone device 107 taken along section B-B of FIG. 1. Similar to the speaker device of the previous example, the microphone device 107 includes a diaphragm 305 having a graphene flake material 310. In this example, the diaphragm 305 is coupled to an audio element 316, such as an electromagnetic transducer, that converts mechanical energy (the motion of the diaphragm 305) into an electrical signal. In particular, sound waves 308 may enter through the opening 320 of the housing 102 and cause the diaphragm 305 to vibrate or oscillate. The diaphragm 305 is coupled to a voice coil 304 which is electromagnetically coupled to the magnet 303. Movement of the diaphragm 305 (caused by the sound waves 308) produces relative motion between the voice coil 304 and the magnet 303 resulting in an induced current in the voice coil 304. The induced current of the voice coil 304 may form the electrical signal or output of the microphone device 107.

While FIG. 3 depicts an audio element 316 including an electromagnetic transducer with a magnet 303 and a voice coil 304, other embodiments may use a different type of audio element 316 that is configured to convert movement into an electrical signal. For example, alternative embodiments may use a piezoelectric element that is coupled between the support structure 302 and the diaphragm 305 to produce an electrical signal in response to vibration or oscillation of the diaphragm 305. The diaphragm 305 may form a conical dome shape that may facilitate the reception of the sound waves 308.

As shown in FIG. 3, the magnet 303 is positioned in a recess 318 of the support structure 302 and may be attached or fixed relative to the support structure 302. The support structure 302 is attached to the housing 102 of the electrical device by a mounting structure 322. The mounting structure 322 may be similar to the mounting structure 222 described above with respect to FIG. 2 and may provide both the mechanical coupling and acoustic isolation between the microphone device 107 and the housing 102.

As shown in FIG. 3, an edge portion 306 of the diaphragm 305 is coupled or attached to the support structure 302. Because the edge portion 306 is fixed with respect to the support structure 302 and the center portion 309 moves in response to the sound waves 308, it may be advantageous for the flexible portion 307 to be flexible or compliant. Additionally, similar to the speaker example, it may be advantageous that the center portion 309 be rigid or stiff to improve the sensitivity of the diaphragm 305 in response to an acoustic signal, such as the sound waves 308. Thus, similar to the speaker example, it may be advantageous to incorporate graphene, such as graphene flake material 310 into the diaphragm 305 to increase the stiffness of the center portion 309 of the diaphragm 305. In some embodiments, center portion 309 is constructed of a base material 314 and a graphene flake material 310 that is incorporated into the base material 314.

In some embodiments, the diaphragm 305 includes varying amounts of graphene in different regions or portions to provide both a rigid center portion 309 and a flexible portion 307. In some implementations, the concentration of graphene flake material in the center portion 309 is greater than the concentration of graphene flake material in the flexible portion 307. The greater concentration of graphene flake material may result in the center portion 309 having a stiffness that is greater than the flexible portion 307. Similarly, a larger graphene flake may be incorporated into the center portion 309 as compared to the flexible portion 307, which may result in a stiffer center portion 309. The concentration and/or size of the graphene flakes 406 may also be configured to reduce the water permeability of the diaphragm 305. Example diaphragms having varying concentrations of graphene flake material are described below with respect to FIGS. 4 and 5.

Figure 4:
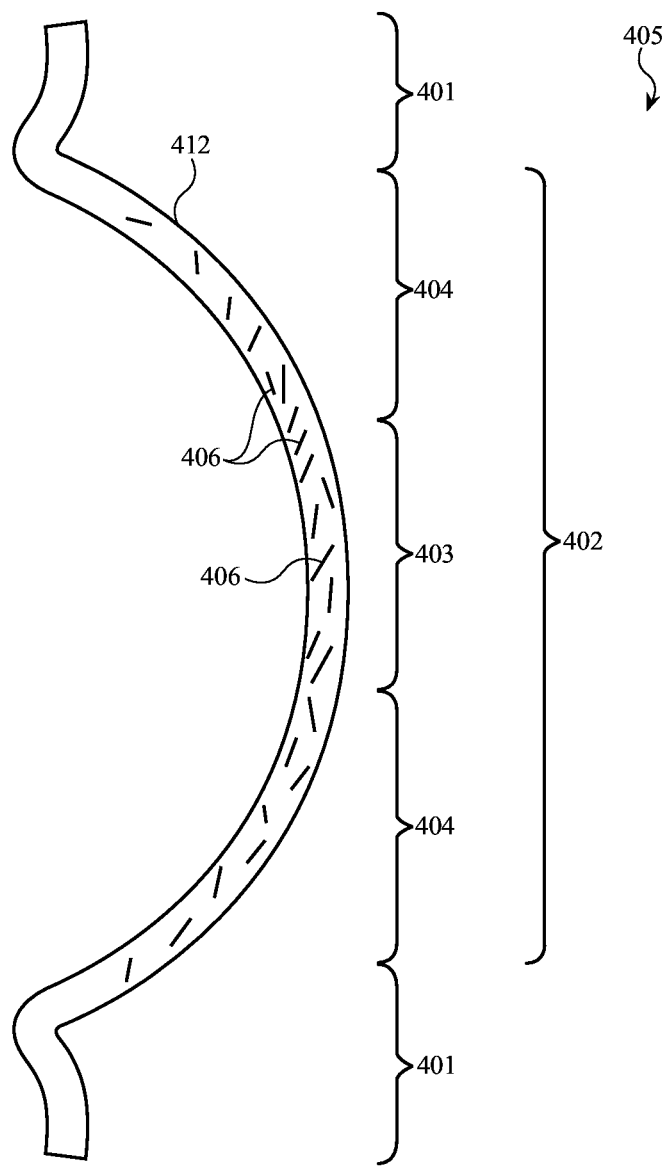
FIG. 4 is a cross-sectional view of an embodiments of a diaphragm taken along section A-A.

FIG. 4 depicts a cross-sectional view of an example diaphragm 405. The example diaphragm 405 may correspond to the diaphragms 205 and 305 of FIGS. 2 and 3, discussed above. More generally, the diaphragm 405 may be used in a variety of acoustic devices to convert electrical signals into acoustic energy (e.g., sound waves) or, conversely, convert acoustic energy into an electrical signal. The diaphragm 405 may have a generally dome shaped geometry.

As shown in FIG. 4, the diaphragm 405 may be formed from different portions having different mechanical properties. Specifically, the diaphragm 405 includes a center portion 402 that is stiffer than the flexible portion 401 that surrounds the center portion. Additionally, the center portion 402 may include an inner center portion 403 that is surrounded by an outer center portion 404 having a different stiffness than either the inner center portion 403 and the flexible portion 401.

Varying the stiffness of diaphragm 405 in areas 401, 403, and 404 may be difficult to accomplish without adversely affecting the mass of diaphragm 405, which can affect performance of the audio device. In addition, an uneven mass distribution across the diaphragm 405 may affect the vibrational response of the diaphragm 405 and adversely affect audio performance.

A graphene material, such as a graphene flake material, may be incorporated into the diaphragm to alter the stiffness without significantly impacting the mass. In general, graphene is pure carbon in the form of a very thin, flexible, nearly transparent sheet. In some cases, a graphene sheet may be a one atom thick sheet of graphite having carbon atoms that are densely packed in a hexagonal pattern. In some embodiments, graphene sheets may be about 0.35 nm or one atom thick. A graphene sheet may be used to form graphene flakes having a smaller area but substantially the same thickness.

Graphene may be up to 100 times stronger than steel by weight. Also, because graphene is a very thin material (having a thickness as low as one atom), the mass of a graphene flake can be precisely controlled by controlling the surface area or flake size. When a graphene flake is incorporated into a base material, such as a polymer, the stiffness of the composite may be precisely controlled without significantly affecting the mass. In the present example, the base material 412 may be a polymer material which may include high or low density polyethylene, polypropylene, polyvinyl chloride, polystyrene and thermoplastic polyurethanes.

In some cases, a graphene flake material 406 may be incorporated into a base material to adjust the stiffness across the diaphragm 405. Embedded graphene flake material 406 may result in a diaphragm 405 that is thinner, stiffer and lighter. A light diaphragm with a low spring constant reduces the need for a complex mechanical damping mechanism and the resultant power loss due to the damping mechanisms. Varying the concentration of the graphene flake material 406 in various portions of diaphragm 405 allows the mass and stiffness of diaphragm 405 to be controlled to optimize performance. The concentration of the graphene flake may vary between concentrations as low as 0.001 percent and up to and including 2 percent.

With reference to the diaphragm 405 of FIG. 4, the center portion 402 may have a higher concentration of graphene flakes 406, which may result in a stiffer center portion 402 without increasing the mass of diaphragm 405. The concentration of graphene flakes 406 in the center portion 402 may be higher relative to a concentration of graphene flakes 406 at flexible portions 401 of the diaphragm 405. The reduced graphene flake concentration in the flexible portion 401 may result in a more flexible or pliable material and facilitate vibration and movement of the diaphragm 405. In some implementations, the flexible portion 401 may have no graphene flakes or a substantially zero concentration of graphene flakes.

Additionally, the center portion 402 may define two or more regions or portions that have varying levels of stiffness. In some implementations, the middle or inner portion of the center portion 402 is the most stiff and outer portions surrounding the middle of the center portion 402 may have decreasing levels of stiffness. In the embodiment depicted in FIG. 4, the center portion 402 includes an outer center portion 404 that surrounds an inner center portion 403. The outer center portion 404 may have a graphene flake material concentration that is lower than the graphene flake material concentration of the inner center portion 403 resulting in a reduced stiffness.

The diaphragm 405 may also have variations in graphene flake size. For example, the center portion 402 may include a first size of graphene flake and the flexible portion 401 may include a second size of graphene flake that is smaller than the first size. The decreased size of the graphene flake may result in a more pliable flexible portion 401 as compared to the center portion 402. Conversely, the increased size of the graphene flake may result in a stiffer center portion 402 as compared to the flexible portion 401. The size of the graphene flake may vary between 1 micron in width to 500 microns in width.

The diaphragm 405 may also include graphene flakes or other graphene material that is oriented in one or more than one direction to provide specific mechanical properties. For example, the graphene flakes may be oriented such that a flake area of a significant portion of graphene flakes are substantially aligned with an outer surface of the diaphragm 405. Having the graphene flakes oriented in this way may result in a diaphragm 405 that has a decreased elastic modulus in a direction perpendicular to the flake area of the graphene flakes. If the diaphragm 405 forms a conical- or dome-shaped shaped portion, as depicted in FIG. 4, the stiffness of the dome-shaped portion may have an increased stiffness or rigidity. Alternatively, the graphene flakes may be oriented along a different direction to provide a specific elastic modulus resulting in a desired rigidity for the diaphragm 405. In some implementations, the orientation of the graphene flakes is substantially randomized and the composite material has an elastic modulus that is substantially isotropic.

While varying concentration and/or size of graphene flakes may be used to vary the stiffness of the diaphragm 405, graphene flakes may also be added in improve the water resistance of the diaphragm 405. In some implementations, graphene flakes 406 in various concentrations may be incorporated into the diaphragm 405 to reduce the water or moisture permeability of the diaphragm 405.

In the embodiment depicted in FIG. 4, the diaphragm 405 is formed from a unitary structure having varying levels of graphene to define different regions or portions, each region or portion having a different stiffness. In an alternative embodiment, one or more of the regions may be formed as a separate part that is attached to the one or more other portions of the diaphragm. In some implementations, the separate portions may be bonded using an adhesive or other mechanical joining technique. In some implementations, one or more separate portions may be over-molded or insert molded onto the other portion(s) of the diaphragm.

Figure 5:
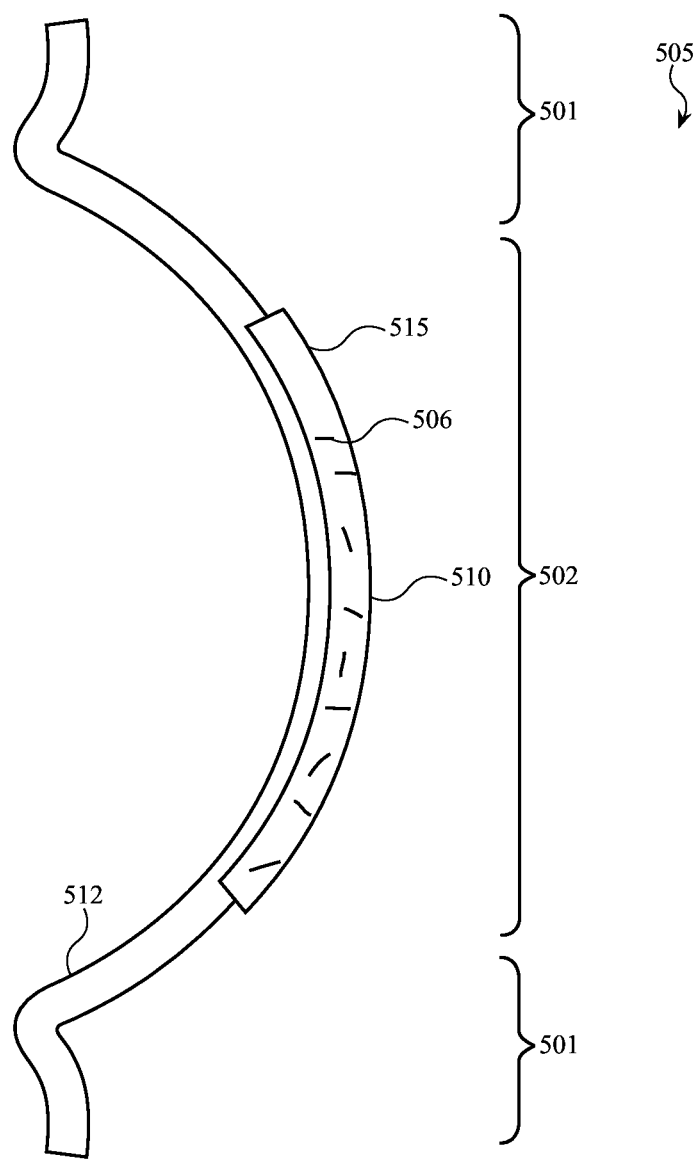
FIG. 5 is a cross-sectional view of another embodiment of a diaphragm taken along section A-A.

FIG. 5 depicts an example diaphragm 505 formed from multiple parts. In particular, the diaphragm 505 includes a membrane structure 512 and a composite cap structure 515. The composite cap structure 515 may be bonded or otherwise mechanically joined to a surface of the membrane structure 512. The composite cap structure 515 may include a graphene flake material 506 incorporated into a base material 510. Similar to the examples described above, an increased concentration of graphene flake material 506 may result in a stiffer composite cap structure 515. The composite cap structure 515 may define all or a portion of the center portion 502 of the diaphragm.

As shown in FIG. 5, at least a portion of the membrane structure 512 forms the flexible portion 501 of the diaphragm 505. The membrane structure 512 may be formed from a flexible material such as a polymer, rubber, or other similar material. In some implementations, the membrane structure 512 may include a lower concentration (including a zero concentration) of graphene flake material as compared to the center portion 502, which includes the composite cap structure 515. The composite cap structure 515 may form at least a portion of the center portion 502 of the diaphragm 505.

Figure 6:
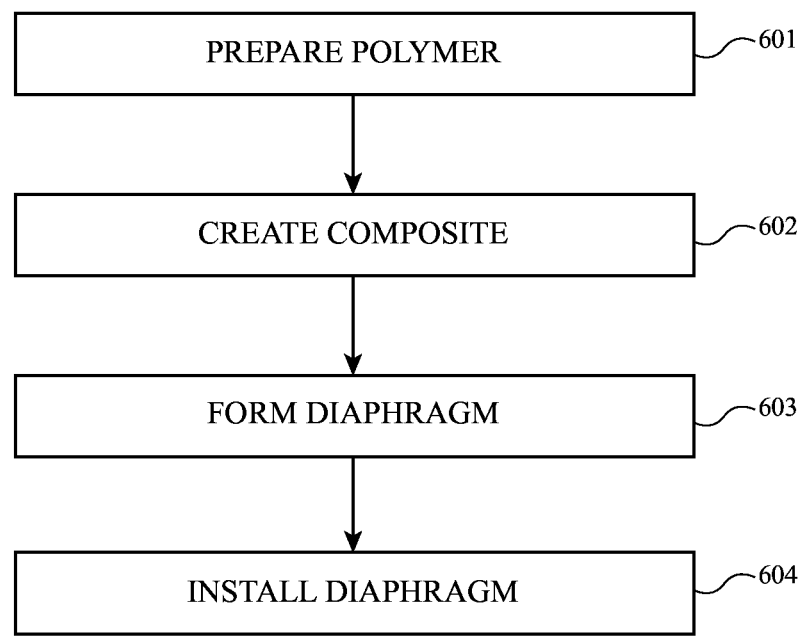
FIG. 6 is a process flow diagram of a process for making a diaphragm including graphene.

FIG. 6 depicts a flow chart of an example process 600 for manufacturing a diaphragm for an audio device, such as a microphone or speaker. Process 600 may be used to manufacture a diaphragm similar to the diaphragms described above with respect to FIGS. 4 and 5.

In operation 601, a polymer material is prepared. The polymer material may be a liquid, which may facilitate the addition of a graphene or graphene flake material. In some implementations, the polymer material is in an uncured liquid state. A hardener or curing agent may be added to polymer material in a subsequent operation to harden the polymer material to a solid state. In some implementations, the polymer material is a thermoplastic polymer that is heated to a liquid or molten state. The polymer material may include a polyurethane, elastomer, fluoropolymer, synthetic rubber, or other similar material.

In operation 602, graphene flakes are added to the base material to create a composite mixture. The graphene flakes may be homogeneously mixed into the polymer, they may be added to the surface of the polymer as a coating, or otherwise integrated with the polymer material. In some implementations, graphene flakes are added to the polymer in quantities sufficient to produce the desired flexibility or stiffness for various portions of the diaphragm. In some embodiments, different size graphene flakes are added to the polymer to produce the desired mechanical properties. The orientation of the graphene flakes may also be controlled to produce a composite mixture having particular properties.

In general, a center portion of the diaphragm may include more graphene flakes to make that area stiffer than the flexible portions to allow more flexibility in the flexible portion where the diaphragm may be attached to a support. The diaphragm may include a center portion including the graphene flakes and a flexible portion formed about the center portion. A greater amount of graphene flake material may be added to form to the center portion of a diaphragm as compared to a lesser amount of graphene flake material that may be added to form the flexible portion of the diaphragm. In some cases, no graphene flakes are added to portions that correspond to the flexible portion.

With regard to operation 602, adding the graphene flakes may include varying the concentration of the graphene flakes for two or more distinct portions of the diaphragm. The size of the graphene flakes may also be varied as larger flakes will generally produce a stiffer end structure while smaller flakes produce a more flexible structure. In some implementations, multiple, separate composite mixtures are formed, each composite mixture having a different concentration and/or size of graphene flake, and each composite mixture may be used to form a different portion of the diaphragm.

Any portions of a diaphragm that are made separately may be joined together. For example, separate portions may be joined using an overmolding process, insert molding process, or co-molding process. The separate portions may also be bonded or attached using an adhesive or other mechanical joining technique.

In operation 603, the diaphragm is formed by molding the composite mixture. The polymer and graphene composite mixture may be molded into a conical, conical dome, or other appropriate shape. Operation 603 may include any one of a variety of molding processes including, for example, injection molding, vacuum molding, pour molding, and the like. As part of the forming operation, the polymer graphene diaphragm may be cured to produce a diaphragm having the desired characteristics.

In general, the forming operation 603 may produce a diaphragm having variations in graphene concentration. For example, a first concentration of graphene flakes may be increased in a center portion of the dome structure as compared to a second concentration of graphene flakes in a flexible portion surrounding the center portion. The forming materials may include a first composite mixture having a first concentration of graphene flakes and a second composite mixture having a second concentration of graphene flakes that is less than the first concentration of graphene flakes. A center portion of the diaphragm may be molded using the first composite mixture and a flexible portion of the diaphragm surrounding the center portion may be molded using the second composite mixture.

The forming operation 603 may also produce a diaphragm having variations in graphene flake size. For example, the center portion may include a first size of graphene flake and the flexible portion may include a second size of graphene flake, where the first size is greater than the second size. The increased size of the graphene flake may result in a stiffer center portion as compared to the flexible portion. Different graphene flakes may be used to firm a first and second composite mixture, each composite mixture having a different size and/or concentration of graphene flakes. In some implementations, the center portion may be formed from a first mixture having a first size graphene flake that is larger than a second size graphene flake of a second mixture used to form the flexible portion of the diaphragm.

The center portion may also be formed from two or more portions, For example, forming the center portion of the diaphragm may further comprise forming an inner center portion having a first concentration of graphene flakes and forming an outer center portion having a second concentration of graphene flakes that is lower than the first concentration. The flexible portion may also be formed having a third concentration of graphene flakes that is lower than the second concentration.

In operation 604, the diaphragm may be installed in an acoustic device. For example, the diaphragm may be connected to a diaphragm support and voice coil in accordance with the examples described above with respect to FIGS. 2 and 3. The acoustic device may form a speaker or microphone and may be incorporated into a housing or other portion of a portable electronic device. Operation 604 may be optionally performed as part of process 600.

Figure 7:
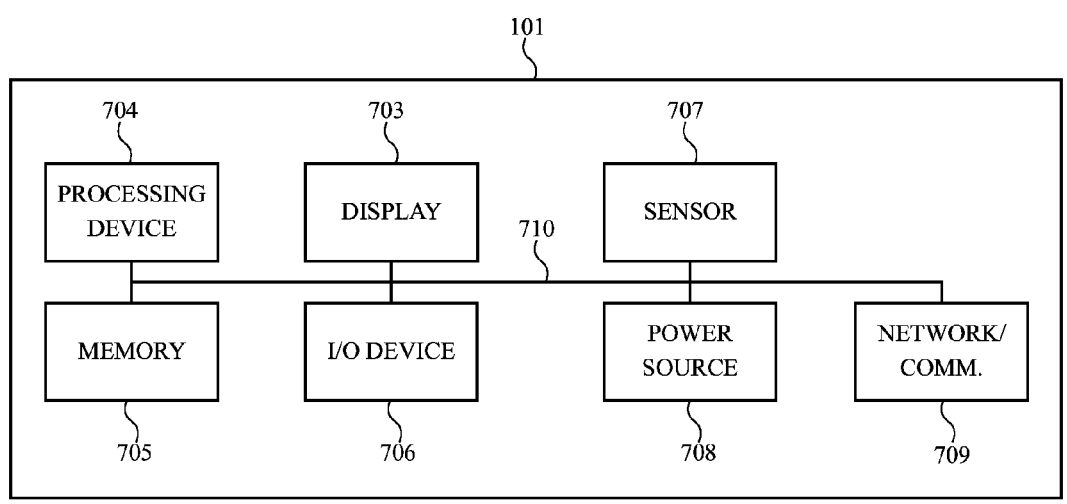
FIG. 7 is an illustrative block diagram of an electronic device.

FIG. 7 is an illustrative block diagram of the electronic device 101 shown in FIG. 1. Electronic device 101 can include display 703, processing device 704, a memory 705, an input/output (I/O) device 706, a sensor 707, a power source 708, and a network communications interface 709 connected on a system bus 710. Display 703 may correspond to the display 103 depicted in FIG. 1. Additionally or alternatively, the display 703 may include another display integrated into the device 101. The display 703 may provide an image or video output for the electronic device 101. Display 703 may be substantially any size and may be positioned substantially anywhere on, and may be operatively associated with, portable electronic device 101.

The processing device 704 can control some or all of the operations of portable electronic device 101. The processing device 704 can communicate, either directly or indirectly, with substantially all of the components of portable electronic device 101. For example, a system bus or signal line 710 or other communication mechanisms can provide communication between the processing device 704, the memory 705, the I/O device 706, the sensor 707, the power source 708, and/or the network communications interface 709.

Processing device 704 can be implemented as any electronic device capable of executing instructions and carrying out operations associated with portable electronic device 101 as are described herein. Using instructions from device memory 705, processing device 704 may, using I/O device 706, regulate the reception and manipulation of input and output data between components of the electronic device 101. Processing device 704 may be implemented in a computer chip or chips. Various architectures can be used for processing device 704 such as microprocessors, application specific integrated circuits (ASICs) and so forth.

Processing device 704 together with an operating system may execute computer code and manipulate data. The operating system may be a well-known system such as iOS, Windows, Unix or a special purpose operating system or other systems as are known in the art. Processing device 704 may include memory capability in memory 705 to store the operating system and data. Processing device 704 may also include application software to implement various functions associated with the portable electronic device 101.

Memory 705 can store electronic data that can be used by the electronic device 101. For example, memory 705 can store electrical data or content such as, for example, audio and video files, documents and applications, device settings and user preferences, timing signals, biometric images such as fingerprint images, data structures or databases, and so on. Memory 705 can be configured as any type of memory. By way of example only, memory 705 can be implemented as random access memory, read-only memory, flash memory, removable memory, or other types of storage elements, or combinations of such devices.

I/O device 706 can transmit and/or receive data to and from a user or another electronic device. One example of an I/O device is button 104 in FIG. 1 which may include a tactile switch. The I/O device(s) 706 can include a display, a touch sensing input surface such as a trackpad, one or more buttons, one or more microphone devices 107 or speaker devices 106, one or more ports such as a microphone port, and/or a keyboard.

The network communication interface 709 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An audio device comprising:
   a support structure;
   an acoustic element disposed within a recess of the support structure; and
   a diaphragm coupled to the support structure, the diaphragm comprising:
      a center portion comprising a base material;
      a flexible portion comprising the base material and surrounding the center portion and configured to flex in response to a movement of the center portion with respect to the support structure; and
      a graphene flake material molded into the base material, wherein a concentration of the graphene flake material is higher within the center portion than within the flexible portion such that an elastic modulus of the center portion is greater than an elastic modulus of the flexible portion.

2. The audio device of claim 1, wherein:
   the center portion has a first stiffness;
   the flexible portion has a second stiffness; and
   the first stiffness is greater than the second stiffness.

3. The audio device of claim 1, wherein:
   the center portion includes a first size of graphene flake;
   the flexible portion includes a second size of graphene flake; and the first size is greater than the second size.

4. The audio device of claim 1, wherein the diaphragm comprises:
a membrane structure, at least a portion of which forms the flexible portion; and
a composite cap structure bonded to a surface of the membrane structure and forming at least a portion of the center portion.

5. The audio device of claim 1, wherein:
the base material comprises a polymer; and
the graphene flake material is molded into the polymer.

6. The audio device of claim 1, wherein:
the acoustic element comprises:
a magnet disposed within the recess of the support structure; and a voice coil attached to the center portion of the diaphragm and
electromagnetically coupled to the magnet; and
the flexible portion is configured to flex in response to relative motion between the magnet and the voice coil.

7. The audio device of claim 1, wherein the audio device forms at least one of a speaker, a headphone, and a microphone.

8. A portable electronic device comprising:
a housing defining an opening;
a display positioned in the opening of the housing;
an audio device comprising:
a support structure;
a diaphragm flexibly connected to the support structure and configured to transmit or receive sound waves, wherein the diaphragm includes graphene molded into a base material, and wherein a concentration of the graphene is higher within a center portion of the diaphragm than within a flexible portion of the diaphragm such that an elastic modulus of the center portion is greater than an elastic modulus of the flexible portion.

9. The portable electronic device according to claim 8, wherein:
the center portion comprises:
an inner center portion; and
an outer center portion surrounding the inner center portion, wherein:
the outer center portion has a graphene concentration that is lower than a graphene concentration of the inner center portion; and
the flexible portion has a graphene concentration that is lower than the graphene concentration of the outer center portion.

10. The portable electronic device according to claim 9, wherein the flexible portion has a substantially zero graphene concentration.

11. The portable electronic device according to claim 8, wherein:
the diaphragm forms a conically shaped dome structure;
the conically shaped dome structure defines an edge portion surrounding the flexible portion; and
the edge portion is attached to the support structure.

12. The portable electronic device according to claim 11, wherein a graphene concentration of the edge portion is greater than the graphene concentration of the flexible portion.

13. The portable electronic device according to claim 8, wherein:
the base material is a polymer; and
the graphene is a graphene flake material.

14. A method for manufacturing a diaphragm for an audio device, the method comprising:
forming a support structure;
positioning an acoustic element within a recess of the support structure;
forming a diaphragm and coupling it to the support structure, wherein the diaphragm is formed by:
preparing a base material;
forming a flexible portion that surrounds a center portion, wherein the flexible portion and the center portion are both formed from the base material;
molding graphene flakes within the base material, wherein a concentration of the graphene flakes is higher within the center portion than within the flexible portion such that an elastic modulus of the center portion is greater than an elastic modulus of the flexible portion.

15. The method of claim 14, wherein:
molding the graphene flakes within the base material includes varying a concentration of the graphene flakes; and
forming the diaphragm comprises forming a first and second distinct portion of the diaphragm, each having a different concentration of graphene flakes.

16. The method of claim 15, wherein:
the first distinct portion defines the center portion formed from a first composite mixture having a first concentration of graphene flakes;
the second distinct portion defines the flexible portion that surrounds the center portion and is formed from a second composite mixture having a second concentration of graphene flakes; and
the first concentration is greater than the second concentration.

17. The method of claim 14, wherein:
preparing the base material comprises forming a first composite mixture having a first size of graphene flakes;
and the method further comprises:
adding a second size of graphene flakes to the base material to create a second composite mixture, the first size being greater than the second size;
molding the center portion of the diaphragm using the first composite mixture; and
molding the flexible portion of the diaphragm surrounding the center portion using the second composite mixture.

18. The method of claim 14, wherein forming the diaphragm further comprises:
forming an inner center portion of the center portion, wherein the inner center portion has a first concentration of graphene flakes;
forming an outer center portion of the center portion, wherein the outer center portion has a second concentration of graphene flakes that is lower than the first concentration; and
forming the flexible portion having a third concentration of graphene flakes that is lower than the second concentration.

19. The method of claim 14, wherein the base material comprises a polymer and the molding is performed with an injection molding process.

* * * * *